ELECTRONIC BILLING CIRCUIT

Filed Dec. 7, 1966 Sheet 1 of 2

INVENTOR.
ARPAD SOMLYODY
BY Robert A. Green
ATTORNEY

INVENTOR.
ARPAD SOMLYODY
BY Robert A. Green
ATTORNEY 3,453,418
Patented July 1, 1969

3,453,418

ELECTRONIC BILLING CIRCUIT

Arpad Somlyody, Raritan, N.J., assignor to Burroughs Corporation, Detroit, Mich., a corporation of Michigan Filed Dec. 7, 1966, Ser. No. 599,927
Int. Cl. G06k *1/00, 3/00;* G06f *7/38*
U.S. Cl. 235—61.6 5 Claims This invention relates to circuits useful in performing a mathematical billing function and, particularly, for assigning different values to the billing operation at different times during the operation of the system.

Briefly, a circuit embodying the invention includes a plurality of counters, each of which has a different weight in a billing operation. Each counter is controlled by a relay, and each relay, in turn, is controlled by an electron discharge device. Each electron discharge device, in turn, is controlled by a diode matrix which itself serves to couple counting signals to the proper relay and counter. To this end, the diode matrix is coupled to a control discharge device which is operated by an input signal, and to a control billing card which includes a plurality of contacts, each of which controls a different combination of diodes and discharge devices.

The invention is described in greater detail by reference to the drawing wherein.

Figure 1:
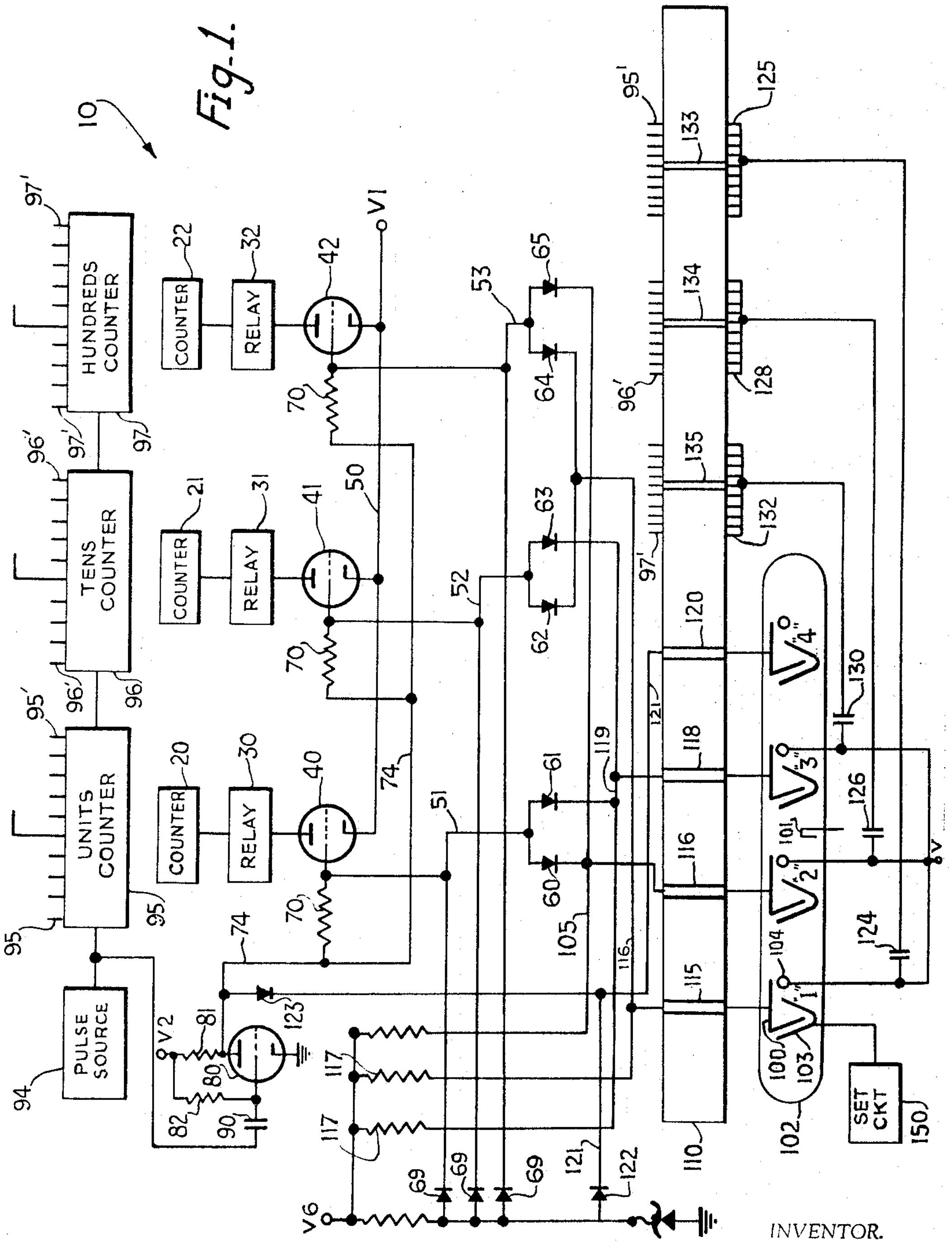
FIG. 1 is a schematic representation of a circuit embodying the invention.

Referring to FIG. 1, a billing circuit 10 includes, for purposes of illustration, three mechanical counters 20, 21, 22 which are operated by relays 30, 31, 32, respectively, and the relays, in turn, are coupled to the anodes of tubes 40, 41, 42, respectively, by which they are operated. The electrodes of tubes 40, 41, 42 are shown in conventional form and are not given separate reference numerals. The cathodes of the tubes 40, 41, 42 are connected together to a relatively low positive potential V1, and the control grids are connected to a steering diode matrix array described below. The source of tube anode potential is not shown.

The grid of tube 40 is connected by lead 51 to the anodes of diodes 60, 61, the grid of tube 41 is connected by lead 52 to the anodes of diodes 62, 63, and the grid of tube 42 is connected by lead 53 to the anodes of diodes 64, 65. Leads 51, 52, 53 are also coupled through diodes 69 to a suitable bias voltage source. Each control grid is also connected through a resistor 70 to a lead 74 which is coupled to the anode of control tube 80. The resistors 70 are sufficiently large to isolate tubes 40, 41, 42 from each other. The anode of the control tube 80 is coupled through resistor 81 to a positive D.C. power source V2, its cathode is connected to ground, and its control grid is coupled both through a resistor 82 to the power source V2 and through a capacitor 90 to an input pulse source 94.

Pulse source 94 is also connected to a group of series-connected counters or registers 95, 96, 97, normally decade counters, in which input pulses can be registered. Each of these counters has an output lead extending from each of its counting positions, and, since the counters are decade counters, each has ten such leads. Counter 95 has output leads 95′, counter 96 has leads 96′, and counter 97 has leads 97′.

In the above-described circuit, each counter 20, 21, 22 is intended to represent a different billing rate. Those skilled in the art will approciate that two counters and two billing rates or more than three counters and more than three billing rates could be used, with the associated circuitry being properly modified to accommodate the selected number of counters.

The circuit 10 also includes circuit means for selecting the billing counter to be set into operation at any instant and for switching from one to another as required. This circuit means includes a plurality of current sources 100 which, in one embodiment of the invention, are the individual target or output electrodes of a magnetron beam switching tube 102. Of course, these current sources may be the output electrodes of transistors or the like.

A beam switching tube such as tube 102 includes an evacuated envelope which contains a cathode 101 which generates and directs a beam of electrons to a plurality of groups of electrodes, each of which includes a target or output electrode 100, a spade electrode 103 and a switching electrode 104 which is used to switch an electron beam from one group of electrodes to the next. A typical beam switching tube includes ten groups of electrodes or ten counting positions, but, for purposes of illustration, only four positions are shown with positions 1, 2, and 3 being billing positions and with position 4 being a stable, non-billing position at which the electron beam in the tube rests at the end of a billing cycle. A billing cycle might include operation of one or more of the three billing positions as described below.

In using the circuit 10, a customer billing card 110 is provided to interrelate the various portions of the circuit to establish the desired billing rate for the particular customer. The billing card shown in the drawing and representing one typical program includes a contact 115 which connects target 100 at the 1 position in tube 102 through lead 116 both to the cathodes of diodes 62 and 64 coupled to tubes 41 and 42, and through a target load resistor 117 to positive D.C. power source V*b*. The card 110 also includes contact 116 which connects the target 100 at position 2 through lead 105 both to the cathodes of diodes 60 and 65 coupled to tubes 40 and 42, and to a load resistor 117. Card 110 also includes contact 118 which connects target 100 at position 3 by lead 119 to the cathodes of diodes 61 and 63 coupled to tubes 40 and 41 and to a load resistor 117. Card 110 includes a contact 120 which couples target 100 at the 4 position in tube 102 by lead 121 through both diode 122 to a bias source and through diode 123 to the anode of tube 80.

Referring again to tube 102, switching grid 104 at position 1 is coupled through a capacitor 124 to ten leads 125 which are aligned through the billing card with the corresponding ten leads 95′ from counter 95. Similary, the switching grid at position 2 is coupled through a capacitor 126 and leads 128 to the leads 96′ from counter 96, and the switching grid at position 3 is coupled through capacitor 130 and leads 132 to the leads 97′ from counter 97.

In operation of the invention and for one particular program, the billing card 110 carries contacts 133, 134, 135 suitably positioned to interconnect one of the leads 95′ with a lead 125, one of the leads 96′ with a lead 128, and one of the leads 97′ with a lead 132. These contacts effectively couple a selected position in the counters or registers 95, 96, and 97 to the switching grids 104 to control the switching of the circuit from one billing counter 20, 21, 22 to another to change the billing rate. This is described in greater detail below.

It might be noted that the diodes 69 provide a clamping potential to prevent the targets 100 from falling to an excessively low potential during operation. Between billing operations, current flow from the target 100 at the last position through contact 120 and lead 121 to the anode of tube 80 keeps the anode of tube 80 and the control grids of tubes 40, 41, and 42 at sufficiently low potential to keep them all off and to inhibit all counters from being turned on.

The billing circuit 10 also includes a beam-setting circuit 150 coupled to the 1 position in tube 102 to form an electron beam at this position preparatory to the initiation of a couting cycle. This may be a circuit for generating negative pulses coupled to the spade electrode 103 at the 1 position. Of course, it might be desirable in some programs to set the beam at one of the other positions in tube 102. Set circuit 150 could be readily used for such a modification.

In operation of the invention, as shown in FIG. 1, it is assumed that the counters 20, 21, and 22 each represent a different billing rate so that each pulse entered in each counter represents a different amount of money to be billed. In addition, it is assumed that the billing cycle will utilize all three counters 20, 21, 22. First, the beam-setting circuit 150 is operated to set an electron beam on target 100 at the 1 position in tube 102 and current flows from target 100 through contact 115 on the customer billing card 110. This current flow applies, through diodes 62 and 64, a negative cutoff potential to the control grids of tubes 41 and 42. In addition, initially, tube 80 is on and couples a negative cutoff potential from its anode through lead 74 to the control grid of tube 40. Thus, initially, all tubes 40, 41, and 42 are off, and the counters 20, 21, and 22 are not energized.

When an input pulse is applied from source 94 to tube 80 (and to counter 95) to represent the performance of an operation to be billed, tube 80 is turned off, and its anode potential rises to a positive level which permits tube 40 to turn on and operate through relay 30 to register a count in billing counter 20. When the input pulse to tube 80 is terminated, the tube again turns on and the original quiescent state of the circuit 10 is restored. Each successive input pulse causes this operation to be repeated, with a count being entered in the counter 20 and in counter 95.

When the count in counter 95 reaches the position from which lead 95' is coupled through contact 133 on billing card 110 to a lead 125 to switching grid 104 at position 1 in tube 102, a switching pulse is applied to this switching grid, and the electron beam flowing from the cathode 101 to target 100 at position 1 is switched to the next group of electrodes at position 2. Now current flows from target 100 at position 2 through contact 116 on the billing card to diodes 60 and 65, and this applies cutoff potential to tubes 40 and 42. Tube 80 now holds off tube 41 until an input pulse is applied from source 94. This switching operation represents a change in the billing rate, and each input pulse from source 94 now causes tube 41 to turn on and register a count in counter 21.

As above, when the count in counter 96 reaches the position which is coupled by lead 96' and contact 134 to lead 128 and thus to the switching grid at the second position in tube 102, the beam in tube 102 switches to the third position. Now, current is applied to diodes 61 and 63 to hold off tubes 40 and 41, and each input pulse causes a count to be registered in counter 22 and in the counting chain including counters 95, 96, 97. Finally, when the count in counter 97 reaches lead 97' which is connected through contact 135 on the billing card and lead 132 to the switching grid at position 3 in tube 102, the beam is switched to the next position which is a non-billing position and represents the end of a counting or billing cycle. At this time, current flow through contact 120 holds the potential of anode 80 at such a low level that all control grids of tubes 40, 41, 42 are biased to cut off. The billing cycle may be repeated by re-establishing the beam at the 1 position. As noted above, the billing program may require the cycle to be started at the second or third positions in tube 102. In addition, the contacts 133, 134, 135 might be placed differently on other billing cards to cause the billing rate to change at different times in the entire program.

Figure 2:
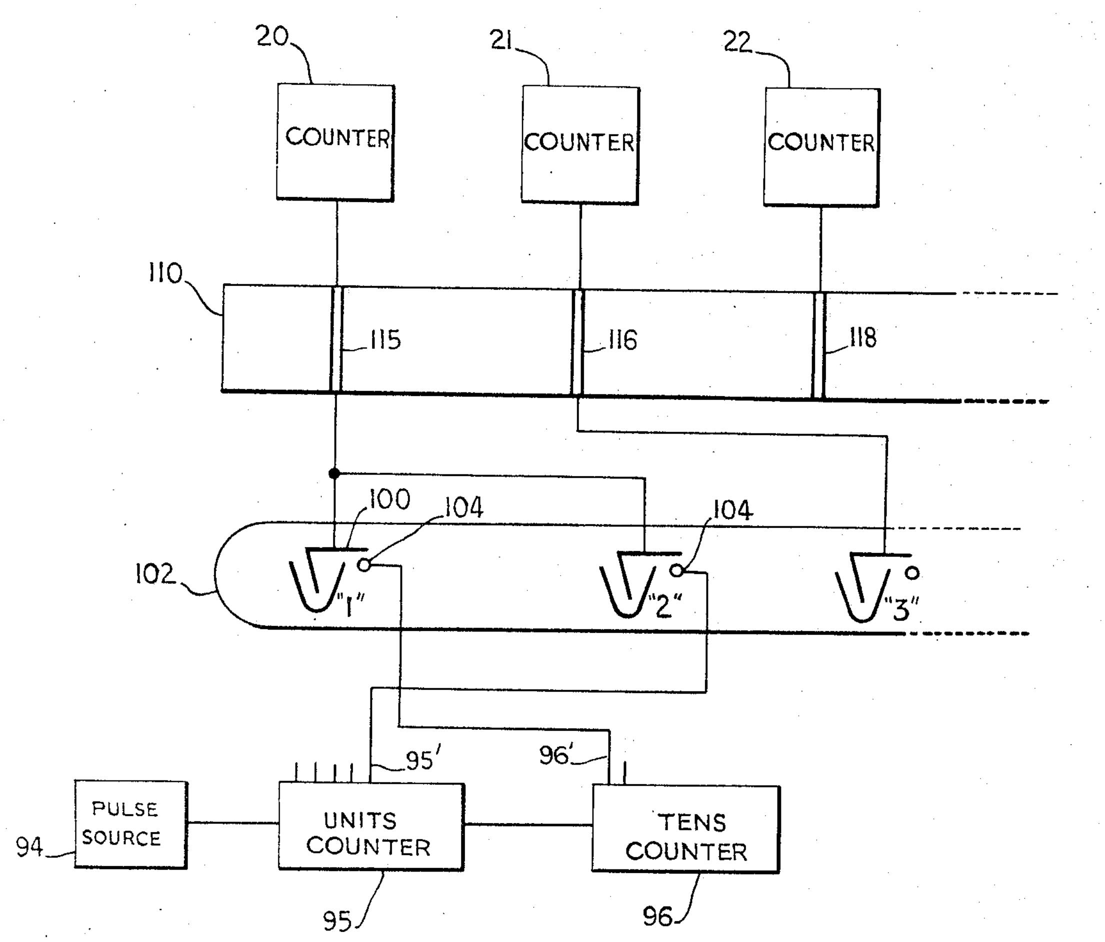
FIG. 2 is a schematic representation of a modification of the invention.

The various possible methods of interconnecting the units, tens, hundreds, etc., stages of the decade counter and the beam switching tube 102 to obtain any desired billing program will be clear to those skilled in the art. However, it might be of interest to describe one particular arrangement using a beam switching tube for switching from one billing rate to another after fifteen counts or input pulses have been received. This modification of the invention is shown in FIG. 2 with portions of the circuit of FIG. 1 omitted to simplify the drawing. In FIG. 2, the target electrodes 100 at the 1 and 2 positions are connected together to contact 115 of the billing card 110, and the target at the 3 position is connected to contact 116. In this case, the five count output lead 95' in the units counter 95 is connected to the grid 104 at the 2 position, and the one count output lead 96' in the tens counter 96 is connected to the grid 104 at the 1 position. Thus, after the first five input pulses have been received and the first units counter reaches the 5 position, a pulse is coupled to the switching grid at the 2 position. However, the electron beam in the tube 102 is not affected, and it is not switched because it is at the 1 position and not the 2 position. When ten counts are received and the first position in the tens counter 96 is energized, a pulse is applied to the switching grid at the 1 position, and the beam is now switched to the 2 position. However, since the target at the 2 position is connected to contact 115, the billing rate is not changed. When five more counts are received and the fifth position in the units is again energized, a switching pulse is applied to the switching grid at the 2 position, and since the electron beam is in the 2 position, it now switches to the 3 position and the billing operation is switched to the next billing rate.

Those skilled in the art will appreciate that the specific circuit elements shown and described may be replaced by equivalent circuits. For example, semiconductor devices may be used instead of tubes, and the beam switching tube may be replaced by a combination of devices.

What is claimed is:

1. An electronic billing circuit including a plurality of current flow devices having means by which they can be turned on separately, a plurality of billing register circuits adapted to register billing counts therein, a diode matrix coupled to said billing register circuits, an insulating billing card having conductive portions which interconnect said current flow devices and said diode matrix whereby current flow from each device can be fed to a different billing register circuit, a decade counter for counting input pulses applied to said circuit, contact means on said billing card for coupling selected counting positions in said counter to said current flow devices for switching operation from one to another, and auxiliary circuit control means coupled to all of said register circuits and adapted to operate in conjunction with said current flow devices and said diode matrix to permit only one billing register circuit at a time to register a count.

2. The circuit defined in claim 1 and including an input pulse source coupled to said decade counter and to said auxiliary circuit control means, each pulse being entered in one of said billing register circuits and representing the performance of an operation to be billed.

3. The circuit defined in claim 1 wherein each billing register circuit includes an electron discharge device and a counter for entering a count to be billed, each discharge device including electrode means for controlling its operation, and said diode matrix and said auxiliary circuit control means are coupled to and operate said electrode means in said discharge devices.

4. The circuit defined in claim 1 wherein said plurality of current flow devices comprise an electron discharge tube having a plurality of output electrodes, from each of which an output current can flow, said output electrodes being adapted to be electrically connected to conductive portions of said billing card.

5. The circuit defined in claim 1 wherein in performing a billing operation, one discharge device is on and the others are off, said one on device being coupled through said billing card and said diode matrix to disable all but one of said billing register circuits, said auxiliary circuit being adapted either to hold off said one of said billing register circuits or to permit it to register a count.

References Cited

UNITED STATES PATENTS

| | | | |
|---|---|---|---|
| 3,008,067 | 11/1961 | Somlyody | 315—8.5 X |
| 3,342,979 | 9/1967 | Wright et al. | |

MAYNARD R. WILBUR, *Primary Examiner.*

THOMAS J. SLOYAN, *Assistant Examiner.*

U.S. Cl. X.R.

235—92